United States Patent Office 2,773,907
Patented Dec. 11, 1956

2,773,907

TRIS-PHENOLS

Frank A. V. Sullivan, Darien, and Arnold R. Davis, Riverside, Conn., assignors to American Cyanamid Company, New York, N. Y., a corporation of Maine No Drawing. Application February 5, 1954,
Serial No. 408,579

4 Claims. (Cl. 260—619)

This invention relates to a composition of matter and more particularly to a 2,6-bis(2'-hydroxy-3'-tertiary-butyl-5'-lower alkyl-benzyl)-4-methyl phenol. More specifically it relates to vulcanized rubber compositions containing the latter class of phenols.

The compounds of this invention may be characterized by the formula:

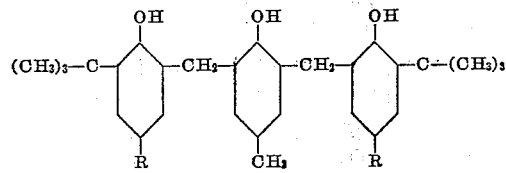

wherein R is methyl, ethyl or n-propyl.

These compounds are useful as antioxidants and particularly as antioxidants for rubber, resins, waxes, lubrication oil, etc.

According to the invention, the compounds may be prepared by reacting at substantially room temperature two moles of a 2-tertiary butyl-4-lower alkyl-phenol with one mole of 2,6-di-(hydroxy-methyl) para-cresol. The 2-tertiary butyl-4-lower alkyl phenols which may be employed are 2-tertiary butyl-4-methyl phenol, 2-tertiary butyl-4-ethyl phenol and 2-tertiary butyl-4-n-propyl phenol. The reactants are all well known and are commercially available.

The invention is further illustrated by the following specific examples to which it, however, is not to be limited.

EXAMPLE 1

*Preparation of 2,6-bis-(2'-hydroxy-3'-tertiary butyl-5'-methyl-benzyl)-4-methyl phenol*

73 grams (0.448 mole) of 2-tertiary butyl-4-methyl phenol are suspended in 150 ml. of heptane and to this suspension is added 37.5 grams (0.224 mole) of 2,6-di-(hydroxymethyl) para-cresol with 11.5 ml. of concentrated hydrochloric acid and 1 gram of sodium lauryl sulfate (Dupanol C) as a dispersing agent. The reaction mixture is digested at 25–30° C. for 15 hours. At the end of this time, the crude product was filtered from the reaction mixture, washed and dried. The yield obtained is 51%; the M. P. 137–142° C. On recrystallization from fresh heptane, 2,6 bis-(2'-hydroxy-3'-tertiary butyl-5'-methyl-benzyl)-4-methyl phenol melted at 154–158° C.

EXAMPLE 2

*Preparation of 2,6-bis-(2'-hydroxy-3'-tertiary butyl-5'-ethyl-benzyl)-4-methyl phenol*

80 grams (0.448 mole) of 2-tertiary butyl-4-ethyl-phenol are suspended in 175 ml. of heptane and to this suspension is added 37.5 grams (0.224 mole) of 2,6-di-(hydroxy methyl) para-cresol with 11.5 ml. of concentrated hydrochloric acid and 1 gm. of sodium lauryl sulfate (Dupanol C) as a dispersing agent. The reaction mixture is digested at 25° C.–30° C. for 16 hours. At the end of this time, the crude product was filtered, washed and dried. The yield obtained is 70%, the M. P. 130°–135° C. On recrystallization from fresh heptane, 2,6-bis(2'-hydroxy-3'-tertiary butyl-5'-ethyl-benzyl) - 4-methyl phenol melted at 140°–141° C.

EXAMPLE 3

*Preparation of 2,6-bis-(2'-hydroxy-3'-tertiary butyl-5'-n-propyl-benzyl)-4-methyl phenol*

86 grams (0.448 mole) of 2-tertiary-butyl-4-n-propyl phenol are suspended in 200 ml. of heptane and to this suspension is added 37.5 grams (0.224 mole) of 2,6-di-(hydroxymethyl) paracresol with 11.5 ml. of concentrated hydrochloric acid and 1 gram of Dupanol C. The reaction mixture is digested at 25–30° C. for 18 hours. At the end of this time, the crude product is filtered, washed and dried. The yield is 72%, the M. P. 120–123° C. On recrystallization from fresh heptane, the product melted at 132° C.

The 2,6-bis(2'-hydroxy-3'-tertiary butyl-5'-lower alkylbenzyl)-4-methyl phenols of the present invention may be utilized in a number of different ways to retard the normal rate of oxidation in rubber. The term "rubber" as used in this description refers to vulcanizable natural and synthetic rubber. During the compounding of vulcanizable rubber, the antioxidant may be added at any stage, although for all practical purposes it is added fairly early. It has been found that the antioxidant is advantageously added to the vulcanizable rubber along with sulfur and an acceleration assistant. Further, it may be dissolved in a suitable solvent and sprayed or painted onto a vulcanized rubber article. This article may also be preserved against normal oxidation by dipping it in a suitable solution of antioxidant.

To further illustrate the applicability of the antioxidants to vulcanizable rubber, 2,6-bis(2'-hydroxy-3'-tertiary-butyl-5'-methyl-benzyl)-4-methyl phenol, which is henceforth designated as antioxidant A, was incorporated into a typical rubber batch having the following formulation:

| | |
|---|---|
| Pale crepe | 100 |
| Fine precipitated calcium carbonate | 60 |
| Titanium dioxide | 20 |
| Zinc oxide | 5 |
| Sulfur | 3 |
| Stearic acid | 1 |
| Benzothiazyl disulfide | 1 |

However, the examples are presented by way of illustration and not of limitation.

EXAMPLE 4

In this example, 1.5 parts of antioxidant A was incorporated into the above formulation. The batch was then vulcanized by curing for 30 minutes at 141° C. The sample was tested for tensile strength and "creep" by methods well known to the rubber chemist or technologist. The results of this test are presented in Tables 1 and 2 below.

EXAMPLE 5

In this example, the batch of rubber formulated as in Example 4 is vulcanized by curing for thirty minutes at 141° C. except the antioxidant is omitted. The sample was tested for tensile strength and creep. These results similarly appear in the tables below.

TABLE 1

| | Oven ageing tests, 30 minutes' cure at 141° C. | | |
|---|---|---|---|
| | Original tensile strength, lbs./sq. in. | Tensile after 48 hrs. in oven at 100° C. | Percent original tensile strength retained |
| No antioxidant | 3,750 | 2,350 | 63 |
| Antioxidant A | 3,700 | 2,775 | 75 |

TABLE 2

| | Percent of "creep" after 48 hrs. at 100° C. with 50 p. s. i. load 30 min. cure at 141° C. |
|---|---|
| No antioxidant | 53 |
| Antioxidant A | 22 |

In Tables 1 and 2 above, it becomes readily apparent that the vulcanizable rubber composition which has been cured, shows a marked lowering of the rate of oxidation when an antioxidant of this invention is incorporated into a vulcanizable rubber composition. The higher percentage of tensile strength retained indicates the better ageing quality of a rubber. Similarly, the lower "creep" value percentage indicates better ageing qualities due to the antioxidant additive.

While in the example above, 1.5 parts of antioxidant per 100 parts of rubber were incorporated, it has been found that a range of from about 0.2 to 3.0 parts of antioxidant per 100 parts of rubber may be advantageously added, depending upon the type of vulcanizable rubber type. For all practical purposes, a range of from 1.0 to 1.5 parts of antioxidant is quite suitable.

The temperature of vulcanization or curing may be permitted to vary in a range of from about 120° C. to 200° C. However, it is preferred that a range of from about 140° C. to 155° C. be employed to prevent undue scorching of the rubber composition within the desirable time to effect the curing operation.

We claim:

1. The compound characterized by the formula:

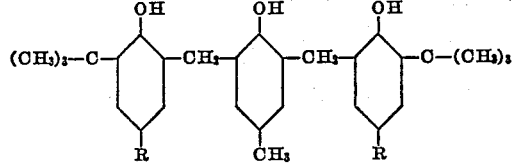

wherein R is a radical selected from the group consisting of methyl, ethyl and n-propyl and in which R is the same in each occurrence.

2. The compound: 2,6-bis(2'-hydroxy - 3' - tertiary-butyl-5'-methyl-benzyl)-4-methyl phenol.

3. The compound: 2,6-bis(2'-hydroxy - 3' - tertiary-butyl-5'-ethyl-benzyl)-4-methyl phenol.

4. The compound: 2,6-bis(2'-hydroxy - 3' - tertiary-butyl-5'-n-propyl-benzyl)-4-methyl phenol.

References Cited in the file of this patent

UNITED STATES PATENTS

| 2,440,909 | Niederl | May 4, 1948 |
| 2,598,234 | De Groote | May 27, 1952 |
| 2,628,212 | Young | Feb. 10, 1953 |